United States Patent Office 3,846,083
Patented Nov. 5, 1974

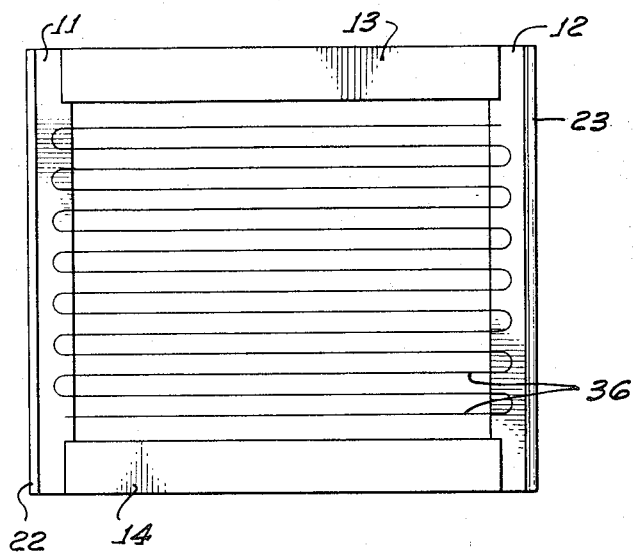
Fig. 10.
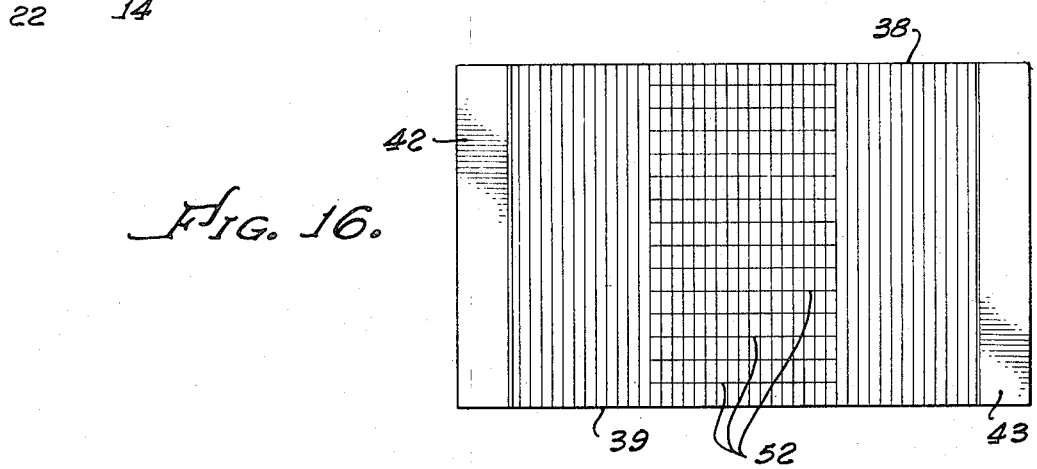
Fig. 16.
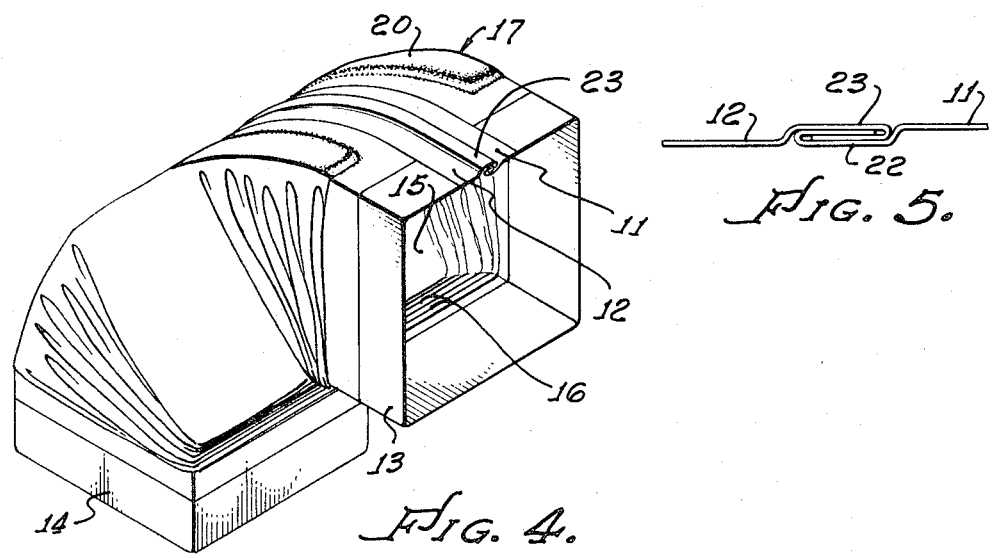
Fig. 5.
Fig. 4.

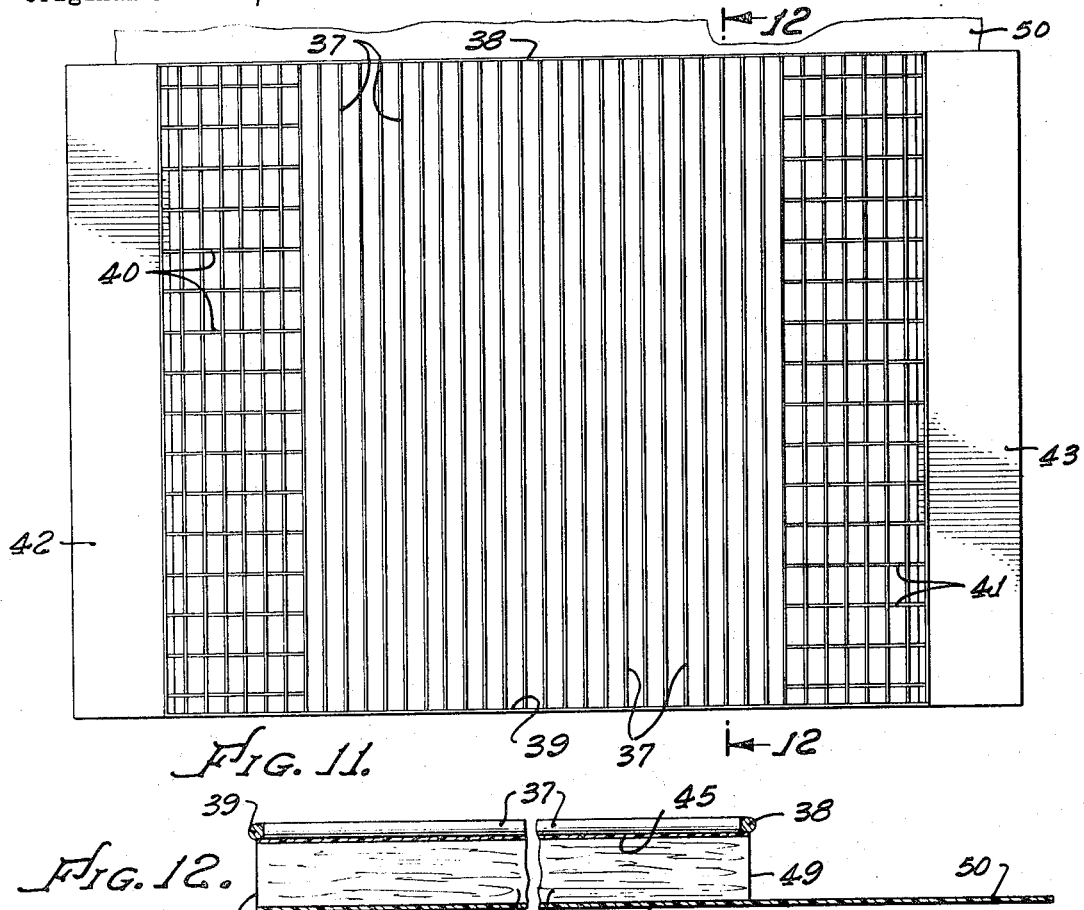
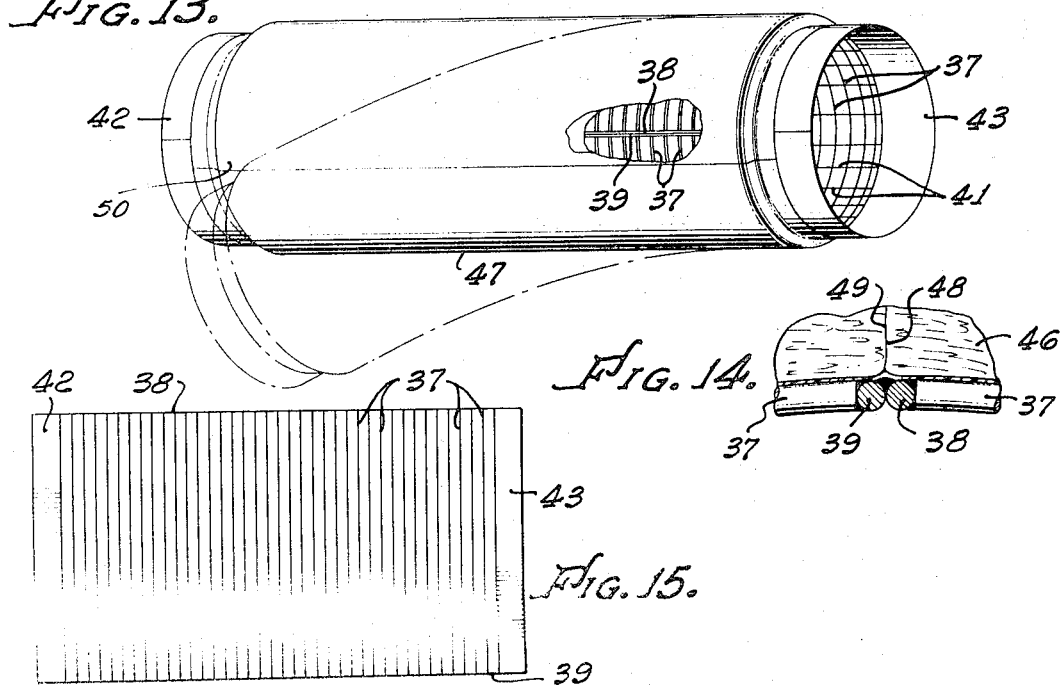

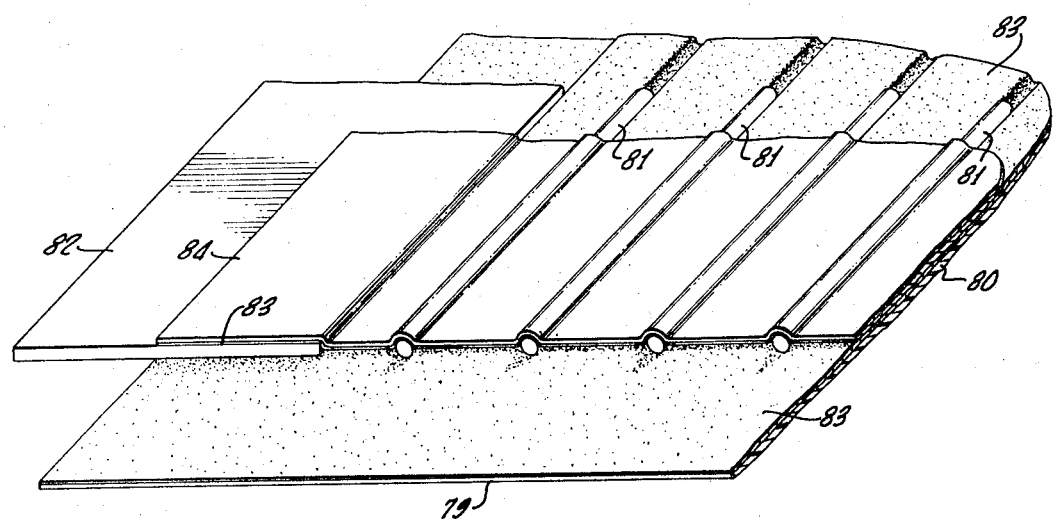
Fig. 24
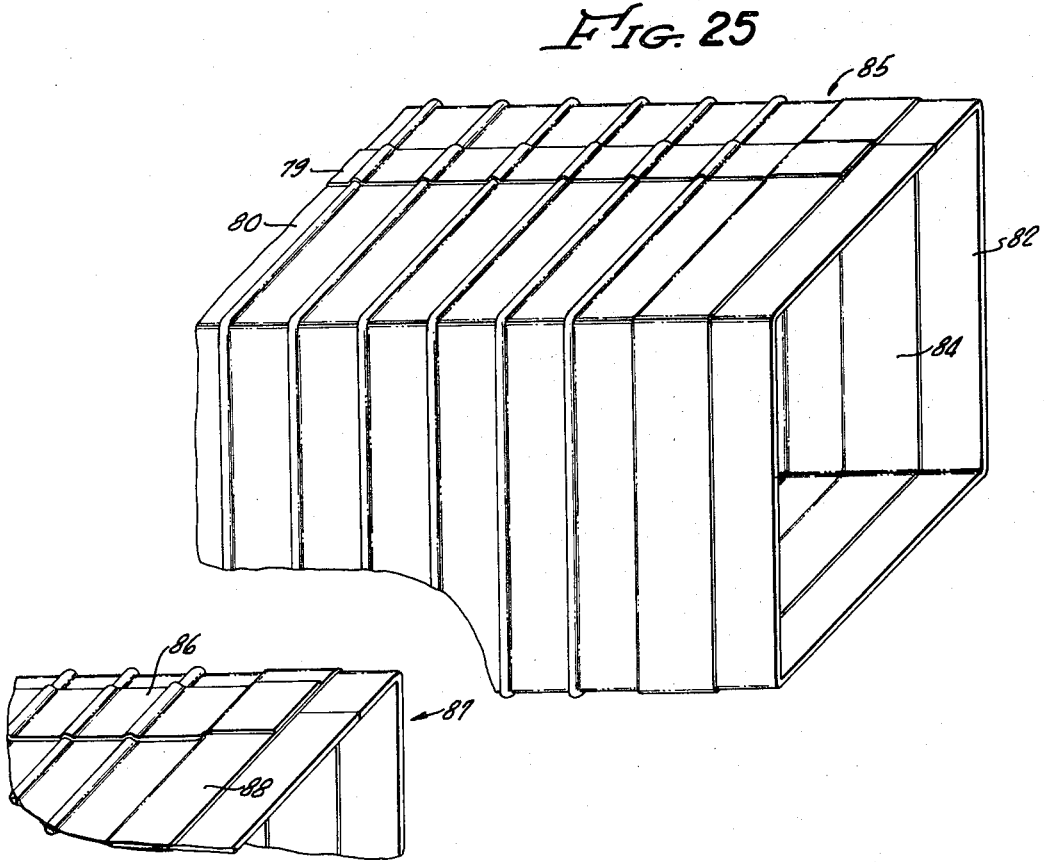
Fig. 25
Fig. 26

3,846,083
FLUID CONDUIT ARRANGEMENT
John F. Kramer, Fullerton, Calif. (2235 W. Broadway, Suite H-102, Anaheim, Calif. 92804)
Application Apr. 29, 1971, Ser. No. 138,685, now Patent No. 3,726,322, which is a continuation-in-part of abandoned application Ser. No. 826,358, May 21, 1969. Divided and this application Apr. 9, 1973, Ser. No. 349,028
Int. Cl. B21d 53/00
U.S. Cl. 29—157 R
9 Claims

ABSTRACT OF THE DISCLOSURE

The arrangement of this invention for providing a fluid conduit includes a plurality of spaced parallel elongated elements positioned in a flat rectangular pattern, a means for holding the elements in the pattern, strips of flat material at the ends, and a sheet of material overlying the elongated members, which is formed into a fluid conduit by effecting appropriate bends in the elongated elements and end strips intermediate the side edges to bring the side edges into adjacency where they are joined. The bends may be of different configurations at the two ends of the unit. When the elongated elements are in spaced parallelism transverse to the unit, the resulting conduit will be flexible and may be bent to form an elbow, or into other shape. When longitudinally extending elongated elements are included, rigidity is imparted at the locations of such elements. Interlocking arrangements may be provided to secure together the side edges, or these edges may be welded or otherwise secured. Two layers of sheet material may be used, bonded together and to the inner and outer surfaces of the elongated elements, and insulation may be provided over the outside.

REFERENCE TO RELATED APPLICATION

This is a division of application Ser. No. 138,685, filed Apr. 29, 1971, now Pat. No. 3,726,322, which is a continuation-in-part of my copending patent application Ser. No. 826,358, filed May 21, 1969, for Fluid Conduit Arrangement, now abandoned.

BACKGROUND OF THE INVENTION

Field of the Invention

This invention relates to a fluid conduit and the method of producing the fluid conduit.

Description of Prior Art

Conventional ducting such as used for air conditioning, heating or other purposes includes pipes and fittings made up of sheet metal at a factory, which then are transported to the job site to be incorporated in a duct system. Special fittings must be produced to enable the ducting to fit into existing spaces and avoid obstructions. Ducts and fittings are made up in sheet metal shops and are quite voluminous to store or to ship. Highly paid and skilled operators are necessary to produce the ducts. In order to provide adaptability, there are ducts of a flexible nature which include a spiral of wire beneath a covering material. These are relatively expensive and, again, must be made up at a factory and, as bulky items, they require a large volume for storage and shipment.

SUMMARY OF THE INVENTION

This invention provides an improved arrangement for providing air ducts and fittings which may be flexible or rigid. In one embodiment, a flat assembly is provided that includes substantially rigid elements in the form of sheet metal strips and a plurality of intermediate spaced parallel wires that define a rectangular pattern. Flexible fluid-impervious sheet material overlies the wires. The assembly is formed into a duct or fitting by bending the wires and end strips transversely so that they are given a permanent set, and the margins of the pattern are brought into adjacency where they are attached and sealed. The resulting fluid conduit is deflectable to provide a flexible duct section. Moreover, it may be bent to form an elbow of any desired angularity.

In forming the duct section, the opposite ends of the unit may be bent to different configurations so that it may be used to interconnect ducts of different proportions. It may be square on one end and rectangular on the other, may have rectangular ends of different proportions, or may be circular or of other shape at one or both ends. The unit is economical to manufacture, and normally is sold, shipped and stored in its flat condition. This offers an enormous saving in storage volume and facilitates transportation of the items. It is a simple matter to bend the unit on a brake or by other means to form the duct section or fitting on the job. This operation may be performed by relatively unskilled personnel.

With the addition of spaced wires extending longitudinally for part or all of the length of the duct, rigidity can be imparted to it in the portions where the longitudinal wires are present. Various standard attaching means may be provided for securing the margins of the pattern, which may be either by an interlocking arrangement or by welding or otherwise. The addition of a transverse sheet metal strip intermediate the ends of the flexible arrangement will provide a means for limiting the angularity that can be imparted to an elbow, so that there is no danger of causing the duct to have such a sharp bend that there will be an undue restriction to the flow of the fluid. Also, this permits the unit to be cut in two at the central strip to produce two 45° elbows or one 90° elbow. It further provides a means for mounting turning vanes to assist the flow of the fluid.

When the unit is produced with longitudinal wires to provide a rigid unit and is to be formed into a rectangular or square shape, the locking arrangement may be at a corner, which means that only three bends of the flat pattern are necessitated.

The covering that is provided over the wires may be of any of a wide variety of materials, such as vinyl sheet material, scrim, foil, etc. Frequently, a layer of appropriate insulation will be included over the sheet material, which then, in turn, may be encased beneath another layer of sheet material. If desired, an additional layer of sheet material may cover the wires, or a protective coating or the like may be included on the wires in the inside of the duct, allowing it to transmit corrosive materials.

When two layers of flexible sheet material are provided, they may be used to hold the transverse members of the pattern in a unitary assembly. An adhesive is employed to bond the sheets to the two sides of the pattern, forming an attachment to the wires and end strips. The sheets are adhesively secured to each other in the spaces between the adjacent wires. An added advantage from the use of two flexible sheets is that, if one should become punctured or torn, such as during the formation of the duct from the flat pattern, the other layer will preserve the integrity of the passageway and leakage will be avoided. When only transverse wires are included in the rectangular pattern and there are no rigid elements extending lengthwise to preclude bending of the duct, it possesses flexibility from one end to the other. Hence, it can be deflected to virtually any contour desired.

An object of this invention is to provide an improved means of producing a fluid conduit.

Another object of this invention is to provide an arrangement by which a fluid conduit may be produced rapidly and easily by relatively unskilled personnel.

A further object of this invention is to provide an arrangement by which a flat unit, which occupies little volume during transportation and storage, may be bent on the job site to provide a fluid conduit tailored to suit the conditions at hand.

An additional object of this invention is to provide an arrangement adapted to produce a single relatively large elbow or which can be severed to provide a duality of smaller elbows.

Yet another object of this invention is to provide an arrangement which can provide a fluid conduit having different configurations at its two ends.

A further object of this invention is to provide an arrangement adapted to provide fluid conduits with different exterior coverings, and which can avoid the need for a separate layer of insulation.

Another object of this invention is to provide an arrangement to produce both flexible and rigid fluid conduits.

A still further object of this invention is to provide an arrangement by which a wide variety of duct shapes and proportions may be produced from a single flat pattern.

These and other objects will become apparent from the following detailed description taken in connection with the accompanying drawings.

BRIEF DESCRIPTION OF THE DRAWINGS

FIG. 4 is a perspective view of a 90° elbow produced from the unit of FIG. 1;

FIG. 5 is an enlarged end elevational view of the seam that connects the edges of the elbow;

FIG. 10 is a plan view of a unit utilizing a continuous length of wire instead of a number of shorter wires;

FIG. 11 is a plan view of a modified form of the unit for producing a duct section rigid at its ends;

FIG. 12 is an enlarged sectional view taken along line 12—12 of FIG. 11;

FIG. 13 is a perspective view of a duct section produced from the unit of FIG. 11;

FIG. 14 is an enlarged fragmentary sectional view of the seam of the duct section of FIG. 13;

FIG. 15 is a plan view of a modification of the unit of FIG. 11, which is flexible throughout its length;

FIG. 16 is a plan view of a further modification of the unit of FIG. 11 which will produce a duct section rigid at the center and flexible at the ends;

FIG. 24 is a fragmentary perspective view of a modification of the pattern of FIGS. 21 and 22 in which the projecting flap is integral with one of the sheets that overlies the wires;

FIG. 25 is a fragmentary perspective view of a duct produced from the pattern of FIG. 24; and FIG. 26 is a fragmentary perspective view of a duct similar to that of FIG. 25 in which a separate strip of adhesive tape is used in lieu of an integral projecting flap.

DESCRIPTION OF THE PREFERRED EMBODIMENTS

Figure 1:
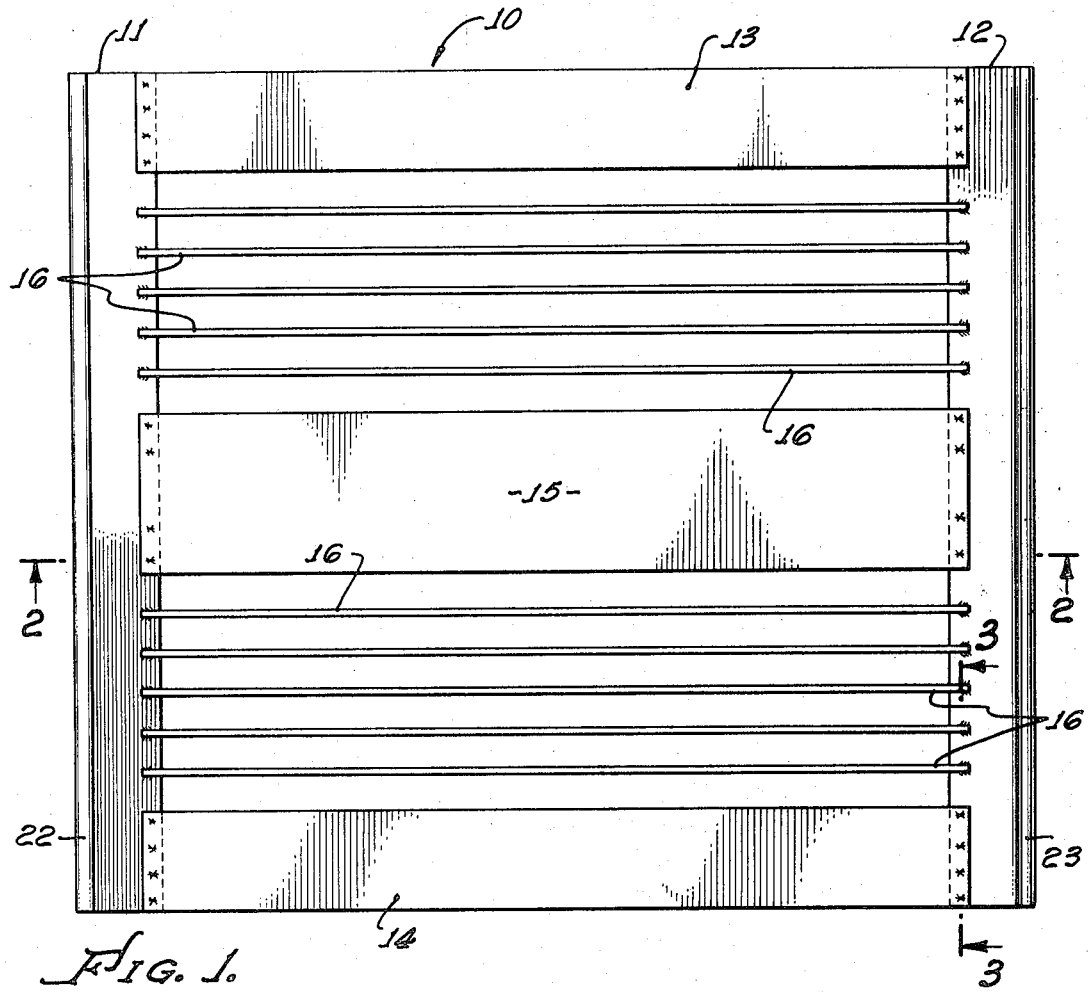
FIG. 1 is a plan view of a unit prepared for subsequent bending to form an elbow or a duct.
Figure 2:
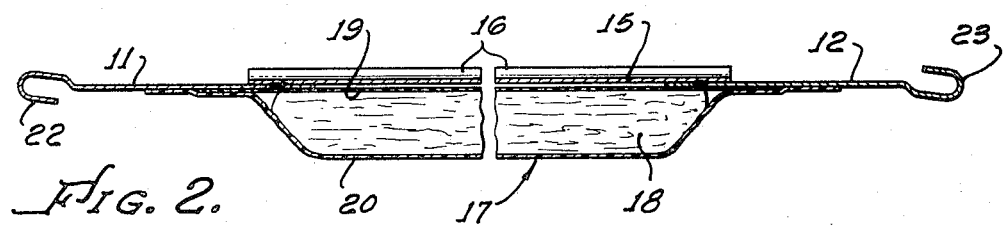
FIG. 2 is an enlarged sectional view taken along line 2—2 of FIG. 1.
Figure 3:
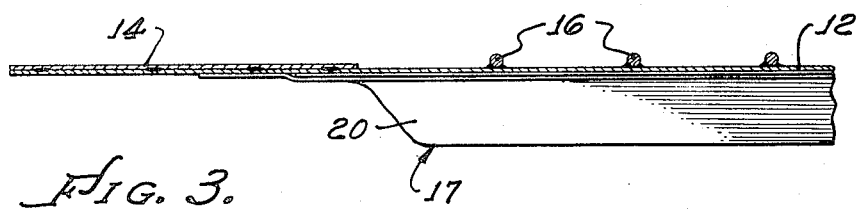
FIG. 3 is an enlarged sectional view taken along line 3—3 of FIG. 1.

The unit 10 shown in FIGS. 1, 2 and 3 may be used for forming flexible elbow fittings. This unit is a relatively flat, rectangular framework made up of sheet metal, wires and a covering material. The sheet metal parts, typically of galvanized iron, include parallel side edge pieces 11 and 12 which at their ends are interconnected by sheet metal strips 13 and 14 that are at right angles to them. An additional and slightly wider metal strip 15, which is parallel to the strips 13 and 14, interconnects the central portions of the side pieces 11 and 12. The connections of the elements 13, 14 and 15 to the side edge strips 11 and 12 may be accomplished by spot-welding.

Also extending between the side edge pieces 11 and 12 are elongated elements 16 that fit in the spaces between the central metal strip 15 and the end metal strips 13 and 14. The elongated members 16 may be of various shapes, such as wires, rods, bars or strips. Desirable results may be achieved through the use of steel rods having a diameter of about $\frac{1}{16}$ inch. The members 16 are spaced apart and parallel to the metal strips 13, 14 and 15, being held in this relationship by welded connections to the side strips 11 and 12.

On one side of the assembly 10 is a covering 17 which closes out the open spaces between the elongated members 16 so that, when the fitting is completed, it can transmit fluid. For air conditioning or heating use, the covering 17 normally will include a layer of insulation. Thus, as seen in FIG. 2, the covering 17 is made up of a blanket of glass fibers 18 enclosed between vinyl sheets 19 and 20. The vinyl sheet 19 is positioned next to the members 16 and extends outwardly over the edge strips 11 and 12 to which it is bonded. The outer vinyl sheet 20 overlaps the margin of the sheet 19 and also is bonded to the edge strips 11 and 12. A similar arrangement is provided at the outer end strips 13 and 14 where, again, the vinyl sheets 19 and 20 extend over these members and are bonded to them. The glass fiber blanket 18 terminates just beyond the inner edges of the metal strips 11, 12, 13 and 14, although it may be extended to overlap further. With the inclusion of the insulation 18, the need for separately insulating the completed elbow may be avoided. Also, this will have the beneficial effect of reducing sound transmission through the fitting.

The outer margins of the edge strips 11 and 12 are provided with an attaching means allowing them to be readily secured together when the fitting is formed. In the embodiment shown, where a double-seam joint is to be produced, there are doubled-over margins 22 and 23 on the side edge strips 11 and 12. The marginal portion 22 is formed on one side of the strip 11, while the marginal portion 23 is bent toward the opposite side of the strip 12, as best seen in FIG. 2. Other arrangements may be provided for holding the adjacent edges of the edge strips 11 and 12 in the desired relationship, such as self-sealing adhesive tape, welding, or any other means.

When a fitting such as a 90° elbow is to be produced it is merely necessary to provide bends in the unit 10 and thereafter to secure the margins of the edge strips 11 and 12. The bends are generally transverse to the strips 13, 14 and 15 and are readily made on a brake. In accomplishing the attachment of the margins, the double-over portions 22 and 23 are fitted one inside the other to provide an interlock, as seen in FIG. 5. After the margins 22 and 23 of the edge strips 11 and 12 are fastened together, the resulting conduit then may be bent to provide a 90° elbow as illustrated in FIG. 4, or an elbow of any desired angularity. When the spacing between the end strips is increased, the elbow may traverse up to 360°. When the elbow is formed, the edge strips 11 and 12 lie along the outside or heel of the elbow, and are bent about an axis transverse to them. The members 16, extending transversely of the edge strips 11 and 12, do not interfere with the bending of the conduit to define the elbow. The elbow retains its shape because of the curvature imparted to the edge strips 11 and 12. The end strips 13 and 14 in the completed elbow serve as a means of attachment to the connecting duct sections.

Figure 6:
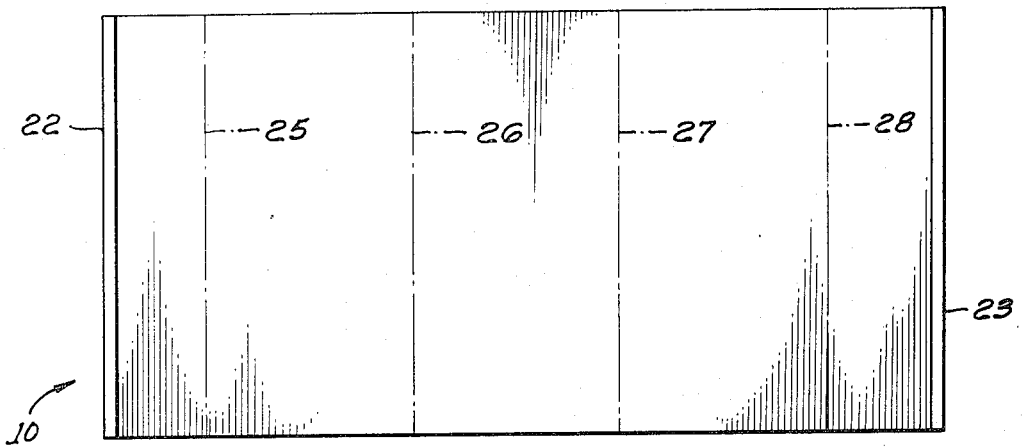
FIG. 6 is a schematic plan view of the unit of FIG. 1 indicating the locations of the bend lines.
Figure 7:
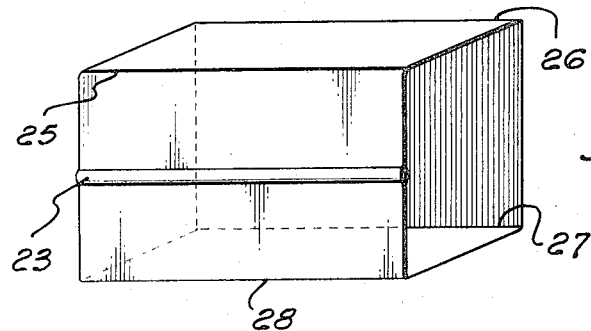
FIG. 7 is a perspective view of a duct section produced by bending the unit as indicated in FIG. 6.

The arrangement for providing an elbow of square cross section, such as shown in FIG. 4, is illustrated schematically in FIGS. 6 and 7. There, lines 25, 26, 27 and 28 represent the locations where the bends are made in the members 16 and end members 13 and 14 to result in a short duct of square cross section. The bends are all parallel to the margins 22 and 23 of the flat pattern. There is equal spacing between the adjacent bend lines 25, 26, 27 and 28. Approximately half of this spacing exists between the outer bend lines 25 and 28 and the marginal portions, with a little additional being provided to allow for the overlap where the connecting seam is produced. With right-angle bends made at these locations, the duct of FIG. 7 is produced. Subsequently, this duct is bent to form the elbow.

The invention is not limited to the production of fittings of square cross section. Instead, they may be rectangular, circular, elliptical, hexagonal or any other shape desired. Moreover, they may be made to different configurations at the two ends of the fitting. For example, a fitting may be of one proportion on one end, such as a rectangular shape 20 inches by 16 inches, and at the opposite end of entirely different proportions, such as 29 inches by 7 inches, or it may be square or rectangular at one end and circular at the other. The variations and combinations almost are limitless. From an assortment of sizes of the unit 10, therefore, hundreds of different elbow sizes and shapes may be produced. The fittings may be completed quite easily in the field, tailored to the situation at hand, and made without skilled sheet metal mechanics. Prior to the fabrication of the fittings, the flat patterns 10 occupy little space for shipment and storage.

If desired, the side edge strips 11 and 12, the elongated members 16 and the end strips 13 and 14 may be formed of a plastic material, such as polyvinyl chloride or from any kind of material having similar physical characteristics. If the material is plastic, it should be thermoplastic so that it can be bent into the desired configuration by heat and force and thereafter retain such configuration upon cooling. The elongated members 16 may be secured to the side edge strips 11 and 12 by any suitable solvent cement. As stated above, all of the components may be formed of any desirable material so long as the material possesses the desired physical characteristics, such as the ability to be bent into different configurations and to retain such configuration.

Figure 8:
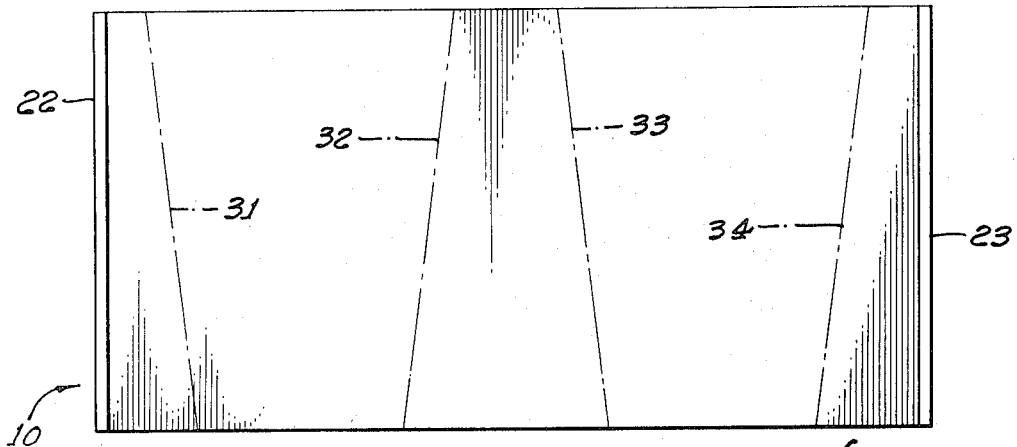
FIG. 8 is a view similar to FIG. 6, but with bend lines shown for providing a duct section of different proportions at its opposite ends.
Figure 9:
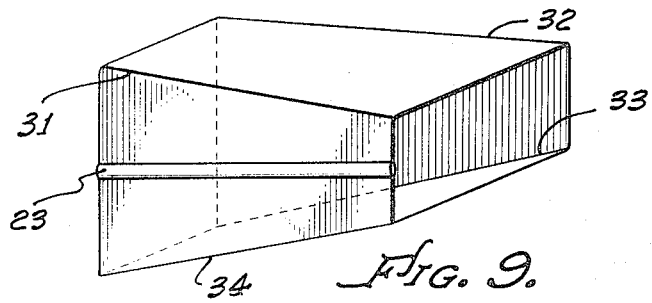
FIG. 9 is a perspective view of the duct section produced from the unit of FIG. 8.

In FIG. 8, the bend pattern is illustrated for producing a duct section as shown in FIG. 9, which is square at one end and rectangular at the other. The bend lines 31, 32, 33 and 34 are not parallel to the outer margins in this instance, but, instead, are inclined. The alternate bend lines 31 and 33 are parallel, while the other set 32 and 34 also are parallel. The spacing of the bend lines at one edge of the pattern, the bottom as shown in FIG. 8, is equal except for the half spacing at the side edges, this being the location where the square shape is to be provided. At the opposite end, however, there is a wide spacing between the ends of the lines 31 and 32 and between the lines 33 and 34. The shorter spacing between the lines 32 and 33 is substantially double that between the line 31 in one side margin and line 34 in the other side margin. Therefore, when 90° bends are effected along the lines 31, 32, 33 and 34, and the margins are secured together, the duct unit of FIG. 9 is produced. This then may be bent to provide a suitable elbow.

While described above as including a covering unit of vinyl sheet material and glass fiber blanket, many other coverings may be utilized. The covering may be of material having no rigidity because the members beneath it provide it with support so that it maintains the intended shape of the fitting. Other materials that may be used include scrim, foil, glass cloth and neoprene or vinyl-coated or impregnated fabrics. Any suitable materials or combinations of materials may be employed to satisfy particular conditions. Generally, it is unnecessary to cover the members 16 on the inside of the fitting. However, sheet material may be included there, if desired, to provide an interior lining. The members 16 may be plastic coated for protection in the event corrosive fluids are to be transmitted.

When the fitting is produced as described above, there is, of course, a sheet metal section intermediate its ends at the location of the central metal strip 15. It offers several advantages to the completed fitting. The presence of the central strip 15 prevents the user from forming a bend in the elbow that is too sharp. Thus, the metal strip 15 necessitates a radius for the completed elbow that is sufficient to assure that the fitting will not provide an undue restriction to the flow of fluid through it. Also, the metal strip 15 may be cut in two, permitting the creation of two 45° elbows rather than a single 90° elbow. Additionally, with the metal strip 15 in place, there is a location for attaching turning vanes to assist the fluid flow around the elbow, if this is desired. It is apparent, however, that the fitting can be constructed without the use of the central metal strip 15, with the various assembly steps remaining unchanged.

In some instances, it may be desirable to provide a fitting that connects between ducts having different outside perimeters. For example, one unit may have an outlet with an outside perimeter of 72 inches, while the second unit has an outlet with an outside perimeter of 54 inches. In such a case, the end strip 13 would have a length of 72 inches and the end strip 14 would have a length of 54 inches. The side edge strips 11 and 12 would converge toward each other as they extended between and connected the extremities of the end strip 13 to the extremities of the end strip 14. The elongated members 16 would be of progressively decreasing lengths toward the end strip 14 comparable to the decreasing distance between the side edge strips 11 and 12.

In the modification of FIG. 10, there is an example of the flat pattern with the central strip omitted. Also, instead of utilizing a plurality of individual elongated members connected to the end strips of the unit, a single element such as a length of wire 36 is employed. This wire is looped back and forth in an undulating pattern to provide parallel sections extending between the side strips 11 and 12. Hence, it provides the equivalent of the individual members 16 and is formed into a fluid conduit the same as the embodiment previously described, varying only in the manner of construction of the flat framework.

While described above as being applied to the fabrication of fittings such as 90° or 45° elbows, the arrangement of this invention is equally adapted for constructing straight duct sections. The flat pattern simply is made longer between the end strips 13 and 14 when it is to be used as a duct section of normal length. Such ducts are produced as readily as the fittings, and permit great flexibility in the installation as they may be bent or deflected appropriately to avoid obstructions as installed on the job without the necessity for fabricating individual fittings to take care of this. Again, the ends of the ducts may have different shapes.

The arrangement shown in FIGS. 11 and 12 provides a duct section which is rigid at its ends but flexible in its intermediate portion. The flat pattern of the unit includes a plurality of spaced parallel elongated members, such as wires or rods, 37 extending perpendicularly between and welded to similar elongated end members 38 and 39. Shorter wires or similar members 40 are secured to the members 39 adjacent the left-hand end as the device is shown in FIG. 11, forming a grid at that location. Similar shorter members 41, parallel to the end members 38 and 39, are welded to the right-hand members 37 to provide an additional grid. Welded to the two members 37 at the side edges are sheet metal strips 42 and 43 at the left-hand and right-hand sides, respectively.

An appropriate covering material is on one side of the unit, which may be of suitable composition as described above to satisfy particular conditions. As illustrated, particularly in FIG. 12, there is a vinyl sheet 45 adjacent the members, beyond which is a glass fiber blanket 46 along the outer surface of which is a vinyl sheet 47. The vinyl sheets 45 and 47 overlap and are bonded to the end strips 42 and 43 similar to the way that the sheets 19 and 20 overlap and are bonded to the strips 11, 12, 13 and 14 in the embodiment of FIGS. 1, 2 and 3. However, along the other edges at the members 38 and 39, the edges 48 and 49 of the glass fiber blanket 46 are left open. At one edge adjacent the member 38, the sheet 47 extends beyond the member 38 to form a projecting flap 50.

When the duct section is fabricated, the unit is shaped to a circular or other configuration as shown in FIG. 13. This brings the edges 48 and 49 of the insulating blanket into adjacency. Also, the members 38 and 39 are brought together and welded to form an attachment. Any other suitable means, such as short pieces of readily deformable wire which may be wrapped around the adjacent members 38 and 39 and twisted, may be used to hold the members 38 and 39 in the desired position. With this type of connection, the unit is more adapted for factory construction than for field assembly as for the embodiments utilizing a mechanical locking arrangement. The projecting flap 50 of the outer sheet 47 overlaps at the joint thereby formed to provide an appropriately sealed exterior. The duct produced in this manner is flexible intermediate its end portions and rigid adjacent the ends. Wherever wires 40 and 41 are present, the rigidity is found, while in between where only the transverse members 37 are located the unit is bendable.

Where full flexibility along the length of the duct is desired, it may be produced as shown in FIG. 15. Here, the shorter wires 40 and 41 are omitted, leaving only the transverse members 37. Hence, when the members 38 and 39 are welded together as the duct is fabricated, there are no rigid elements extending lengthwise to preclude bending of the duct. Therefore, the duct possesses flexibility from one end to the other. In this arrangement, the wires 38 and 39 are of a gauge which permits their deflection in any direction as the duct is flexed, and these wires may assume a corrugated configuration when on the inside of the bend.

In FIG. 16, the duct is constructed with only the transverse members 37 adjacent the end strips 42 and 43. However, at the central portion, there are included shorter wires 52 extending lengthwise, or parallel to the edge members 38 and 39. Hence, when this version is formed into a completed duct, it is flexible at its end portions and rigid at its central part.

Figure 17:
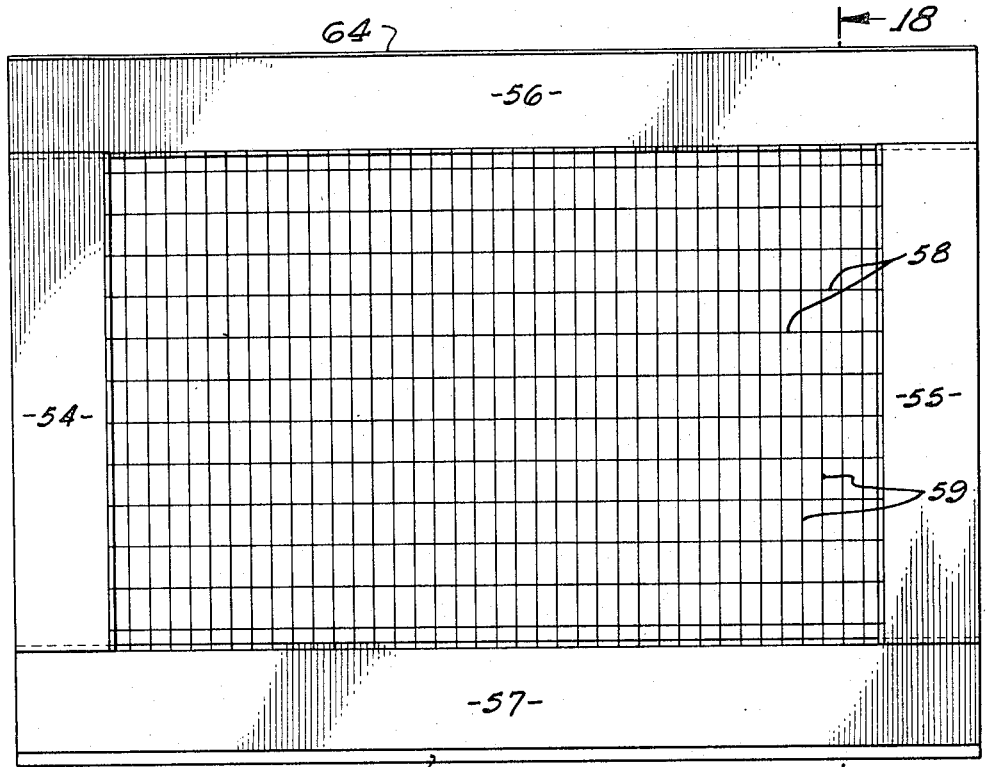
FIG. 17 is a plan view of another embodiment of a unit to provide a rigid duct section.
Figure 18:
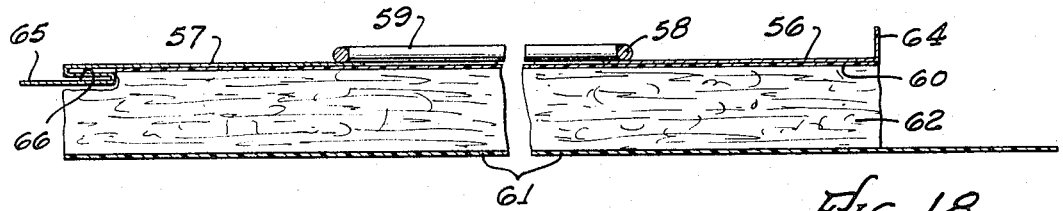
FIG. 18 is an enlarged sectional view taken along line 18—18 of FIG. 17.
Figure 19:
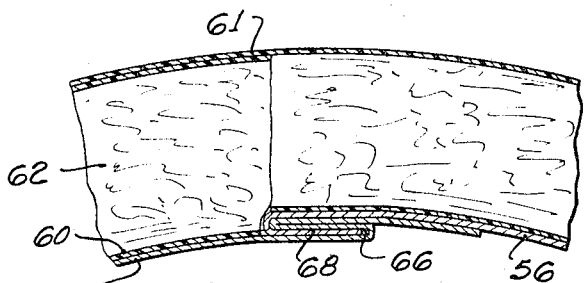
FIG. 19 is an enlarged fragmentary sectional view of the seam portion of a duct produced from the unit of FIG. 17.

In the arrangement shown in FIGS. 17, 18 and 19, the flat pattern includes sheet metal end strips 54 and 55 spot-welded or otherwise suitably secured to sheet metal edge strips 56 and 57. To these strips are attached longitudinal and transverse elongated members 58 and 59, respectively, forming a grid. Again, a suitable material overlies one side of the unit to provide the sealing medium, which may be a vinyl sheets 60 and an outer sheet 61 with a layer of insulation 62 between them. The margins of the strips 56 and 57 are bent to provide a Pittsburgh lock to effect the attachment of these parts of the unit when the duct is formed. In providing this, the metal strip 56 has a flange 64 bent at right angles to it. The margin of the other side strip 57 is twice doubled over to leave a short outwardly projecting flange 65, while providing an outwardly facing slot 66 along the margin of the strip 57. When the duct is formed, the flange 64 of the margin strip 56 is fitted into the slot 66. The flange 65 then is bent at right angles to overlap the edge of the strip 56 and prevent the flange 64 from escaping from the slot 66. This form of attachment, therefore, is adapted to be made at the corner of the completed duct when the unit is to be of square or rectangular cross section. With this location of the seam, the square or rectangular duct may be formed with only three bends, rather than four as in the previously described embodiment where the joint was effected in the flat portion of one side. With this type of lock and the grid of cross wires as shown, the duct is a rigid unit.

Figure 20:
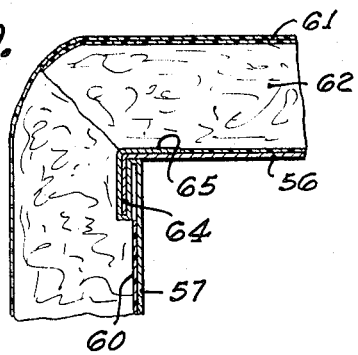
FIG. 20 is an enlarged fragmentary sectional view of the seam portion where the duct section is made circular in cross section.

The Pittsburgh lock also can be used as shown in FIG. 20 when a round duct is to be provided from the pattern of FIG. 17. In that event, a flange 68 is provided on the edge strip 56, which is doubled over and parallel to the edge of the strip rather than being at right angles as described above. This enables it to enter the receptacle 66 in the mating portion of the lock without traversing a right-angle bend.

Figure 21:
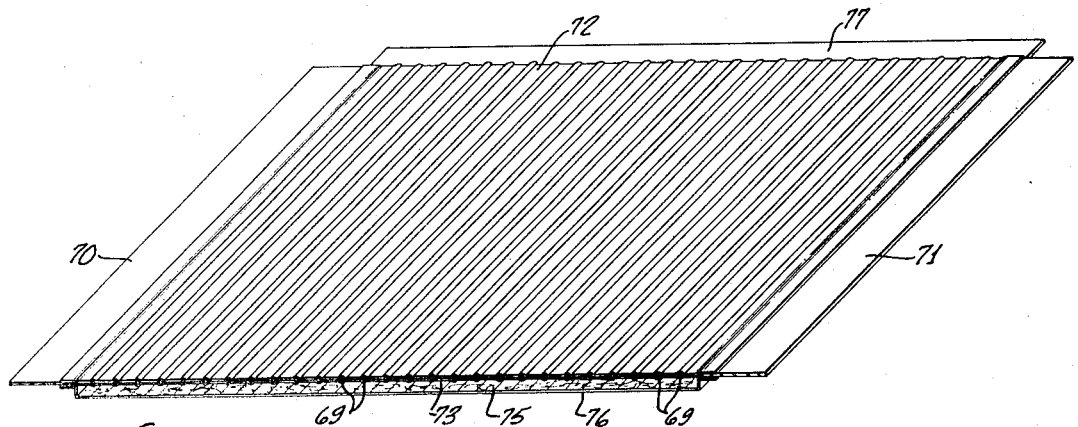
FIG. 21 is a perspective view, partially in section, of a unit for producing a duct in which the transverse elements are held between superimposed layers of sheet material bonded together.
Figure 22:
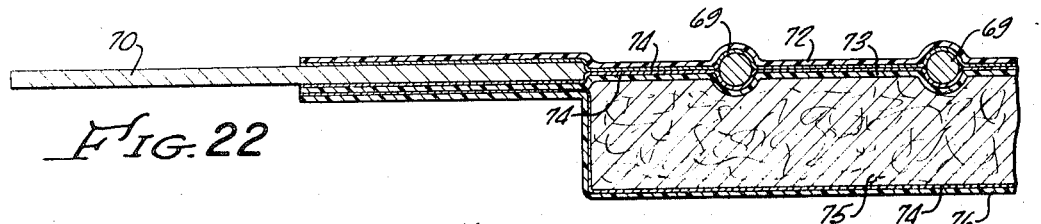
FIG. 22 is an enlarged fragmentary view of one end portion of the pattern of FIG. 21.

The wires intermediate the end strips of the flat pattern may be held together effectively by a double layer of sheet material secured by adhesive, as illustrated in FIGS. 21 and 22. In this arrangement, as in that of FIG. 15, full flexibility of the resulting duct is obtained. Accordingly, there are parallel wires 69 intermediate and parallel to sheet metal end strips 70 and 71, collectively forming a rectangular pattern, with the opposite end portions of the wires and strips being at the opposite edges of the pattern. There are two sheets of flexible material 72 and 73 covering the upper and lower portions, respectively, of the pattern as it is illustrated. The sheets 72 and 73 are secured to the wires 69, and to each other intermediate the wires 69, by an adhesive 74. The edges of the sheets 72 and 73 overlap the end strips 70 and 71 and are bonded to these elements by the adhesive 74.

In the event that it is desired to produce an insulated duct section, a layer of insulating material, together with a covering sheet, is applied to one side of the pattern. The insulation is optional. In the example shown, there is a blanket 75 of suitable insulating material positioned adjacent the lower vinyl sheet 73. An outer layer 76 of vinyl covers the insulation 75 and overlaps the marginal portions of the vinyl sheet 73 to which it is bonded by additional adhesive 74. A strip 77 of the sheet material, which may be similar to the flap 50 of FIGS. 11, 12 and 13, is included along one side edge of the pattern.

Figure 23:
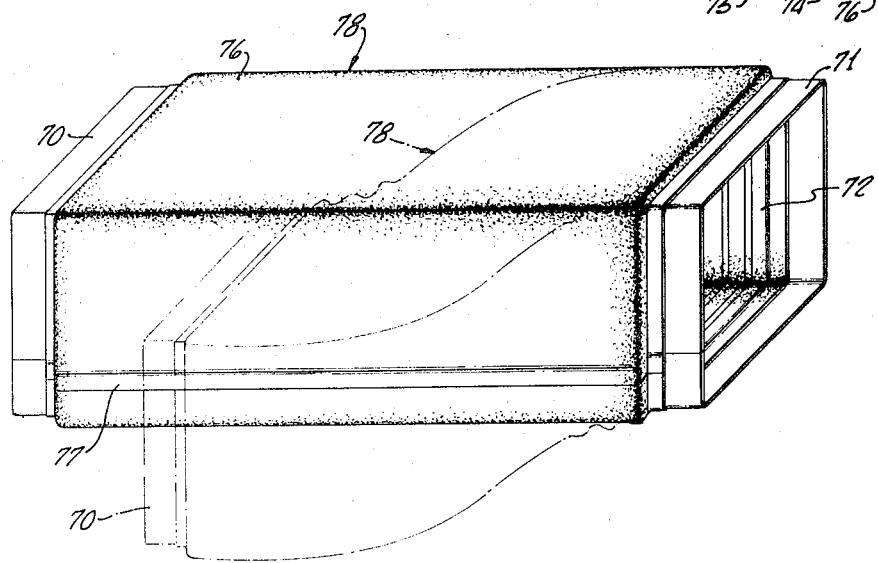
FIG. 23 is a perspective view of a duct section produced from the pattern of FIG. 21.

The pattern of FIG. 21 is formed into a completed duct, such as the rectangular duct 78 shown in FIG. 23, by bending the wire 69 and the end strips 70 and 71 transversely so as to give them a permanent set, with the opposite edge portions of the pattent in adjacency so as to define the shape of the duct. Then, the adjacent edge portions are secured together with the strip 77 extending over the outside of the joint and bonded to the adjacent outer surface of the duct assembly, effecting a seal. When, as in the embodiment of FIG. 15, there are no rigid elements extending lengthwise of the duct, it is fully flexible intermediate its ends, as indicated in phantom in FIG. 23.

The bonded sandwich construction provides an effective means for holding together the assembly of wires, strips and sheet material. This also results in a safety factor to minimize the likelihood of leakage when the duct section is produced from the flat pattern. If the outer sheet material should become torn, the inner layer will remain intact to confine the fluid being transmitted, which is of particular significance when the insulation 75 is omitted. When the adhesive 74 is a nonhardening type, some relative movement between the sheets and wires is permitted when the parts are bent to form the duct 78. This assists in avoiding damage to the outer sheet.

In the embodiment of FIG. 24, the projecting flap 79 is integral with one of the flexible sheets 80 that overlies the wires 81 and the end strips 82. A pressure-sensitive adhesive 83 may be used on the sheet 80 and its flap 79, as well as on the inner surface of the other flexible sheet 84. When the pattern of FIG. 24 is formed into the duct 85 of FIG. 25, the flap 79 overlaps the outside of the joint and is bonded to the outer surface of the sheet 80. This effectively seals the passageway defined by the duct 85, and may be used as the sole attaching means to hold the edge portions of the pattern together. In the latter event, the edge members (such as wires 38 and 39 of FIG. 15) may be omitted. Normally, prior to attachment of the flap 79, the adhesive 83 on the flap is protected by a removable strip of the type normally applied to pressure-sensitive adhesives.

In the embodiment of FIG. 26, a separate strip of adhesive tape 86 is applied to the duct 87 after the support members have been bent transversely to define the fluid passageway. The adhesive tape 86 accomplishes the seal for the duct 87, overlapping the outer sheet 88 at the joint and holding together the adjacent edge portions of the joint.

The foregoing detailed description is to be clearly understood as given by way of illustration and example only, the spirit and scope of this invention being limited solely by the appended claims.

I claim:
1. The method of providing a fluid conduit comprising the steps of
arranging a plurality of elongated members so as to define a substantially rectangular pattern having open spaces therein,
positioning a substantially flat and rigid strip at either end of said pattern to form a part thereof,
holding said elongated members and said strips together in said pattern,
superimposing a flexible sheet on said elongated members to cover said open spaces,
then bending said elongated members, said sheet and said strips in a direction generally transverse to said strips so as to cause said strips and elongated members to be given a permanent set such that opposite edge portions of said pattern are brought into adjacency and said sheet, said strips and said elongated members define a passageway collectively therethrough and said strips extend around the ends of said passageway,
and attaching together said edge portions of said pattern when so bent,
thereby providing a fluid conduit.
2. The method of providing a fluid conduit comprising the steps of
interposing a plurality of substantially parallel wires between a duality of flexible sheets,
extending opposite edges of said sheets over sheet metal strips substantially parallel to said wires,
bonding said sheets to said wires, to said strips and to each other intermediate said wires so as to form a unitary assembly,
then bending said wires and said strips transversely so as to give the same a permanent set and to bring opposite edge portions of said assembly into adjacency,
thereby to define a passageway,
and then attaching said edge portions together and effecting a seal for said passageway.
3. The method as recited in claim 1 in which a nonhardening adhesive is applied to said sheets for effecting said bonding.
4. The method as recited in claim 1 in which said strips and wires are bent to different predetermined configurations to provide different shapes at the opposite ends of said passageway.
5. The method of providing a fluid conduit comprising the steps of
providing a duality of substantially rigid flat strips in spaced parallelism,
positioning a plurality of elongated members intermediate said strips with said elongated members being in spaced parallelism and said strips and said members defining a substantially rectangular pattern in which the opposite end portions of said elongated members and said strips extend to opposite edge portions of said pattern,
superimposing a first flexible sheet over said pattern on one side thereof,
superimposing a second flexible sheet over said pattern on the opposite side thereof,
bonding said first and second sheets to said elongated members and to said strips and to each other so as to provide a unitary assembly,
then bending said elongated members and said strips transversely so as to give said elongated members and said strips a permanent set and to bring said opposite edge portions of said pattern into adjacency, thereby defining a passageway,
and then attaching said edge portions together and effecting a seal for said passageway.
6. The method as recited in claim 5 in which in attaching said edge portions together and effecting a seal for said passageway a flexible strip of sheet material is bonded to the exterior of said passageway at the vicinity of said edge portions.
7. The method as recited in claim 5 in which for attaching said edge portions together and forming a seal
said first flexible sheet is extended beyond said pattern at one of said edge portions to provide a strip of flexible material,
said elongated members and said strips are bent so that said first flexible sheet is on the outside of said passageway,
and said strip of flexible material is caused to overlap the adjacent exterior surface of said first flexible sheet and is adhesively secured thereto.
8. The method as recited in claim 5 in which said strips and said elongated members are bent to different predetermined configurations to provide different shapes at the opposite ends of said passageway.
9. The method as recited in claim 5 in which attaching said edge portions together and effecting a seal for said passageway a strip of adhesive tape is attached to said passageway at the vicinity of said edge portions.

References Cited
UNITED STATES PATENTS

| | | | |
|---|---|---|---|
| 2,371,042 | 3/1945 | Fogg | 138—138 |
| 2,426,058 | 8/1947 | Scogland | 156—218 |
| 2,625,499 | 1/1953 | Nebesar | 138—178 |
| 2,937,664 | 5/1960 | Plummer | 138—128 |
| 3,212,529 | 10/1965 | Ullman et al. | 138—141 |
| 3,422,525 | 1/1969 | Jeppsson | 138—156 |
| 1,675,316 | 6/1928 | Russell | 138—109 |
| 1,981,413 | 11/1934 | Goodfellow | 138—120 |
| 1,993,965 | 3/1935 | Huck et al. | 138—128 |
| 2,371,556 | 3/1945 | Steffens et al. | 138—119 |
| 2,858,854 | 11/1958 | Daggett | 138—124 |

(Other references on following page)

UNITED STATES PATENTS

| | | | |
|---|---|---|---|
| 3,251,382 | 5/1966 | Tatsch | 138—151 |
| 3,369,568 | 2/1968 | Davis et al. | 138—168 |
| 3,496,965 | 2/1970 | Hureau | 138—123 |

FOREIGN PATENTS

| | | | |
|---|---|---|---|
| 560,270 | 3/1944 | Great Britain | 138—56 |

CHARLES W. LANHAM, Jr., Primary Examiner

D. CRANE, Assistant Examiner

U.S. Cl. X.R.

29—157 A; 156—218